United States Patent [19]

Roman

[11] Patent Number: 5,072,971
[45] Date of Patent: Dec. 17, 1991

[54] MALE-FEMALE FITTING ELEMENT, IN PARTICULAR FOR HOSES HAVING A LARGE DIAMETER

[75] Inventor: Gianfranco Roman, Pasiano, Italy
[73] Assignee: Claber S.p.A., Italy
[21] Appl. No.: 480,116
[22] Filed: Feb. 14, 1990

[30] Foreign Application Priority Data

Feb. 20, 1989 [IT] Italy ............................... 19494 A/89

[51] Int. Cl.⁵ ............................................ F16L 55/00
[52] U.S. Cl. ..................................... 285/88; 285/402
[58] Field of Search ................... 285/87, 88, 359, 360, 285/361, 376, 395, 396, 401, 402

[56] References Cited

U.S. PATENT DOCUMENTS

| | | | |
|---|---|---|---|
| 692,795 | 2/1902 | Moyle | 285/361 X |
| 1,038,948 | 9/1912 | Patrick | 285/87 |
| 1,080,675 | 12/1913 | Berg | 285/87 |
| 1,117,762 | 11/1914 | Barcus | 285/361 |
| 2,087,180 | 7/1937 | Bohn | 285/359 |
| 4,313,626 | 2/1982 | Duncan | 285/402 X |

FOREIGN PATENT DOCUMENTS

| | | |
|---|---|---|
| 403500 | 7/1934 | Belgium . |
| 099033 | of 1984 | European Pat. Off. . |
| 3330217 | 2/1985 | Fed. Rep. of Germany . |
| 275851 | 10/1964 | Netherlands . |

Primary Examiner—Dave W. Arola
Attorney, Agent, or Firm—Eckert Seamans Cherin & Mellott

[57] ABSTRACT

The fitting element is constituted by a male element, with a hollow cylindrical tang having a plurality of ribs, arranged axially and protruding in a radial direction, and by a female element, essentially constituted by a hollow cylindrical casing suitable for receiving tang of male element. On the inside wall of female element there is obtained a plurality of grooves suitable for receiving by axial sliding the corresponding ribs; each of said grooves is flanked by a lateral seat, which receives one of said ribs following the rotation, sebsequent to the axial sliding, of male element.

2 Claims, 10 Drawing Sheets

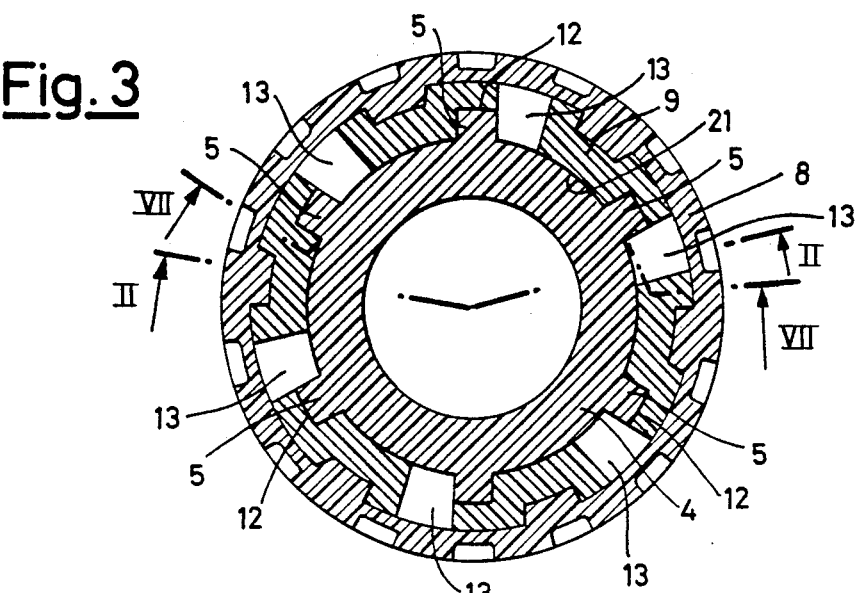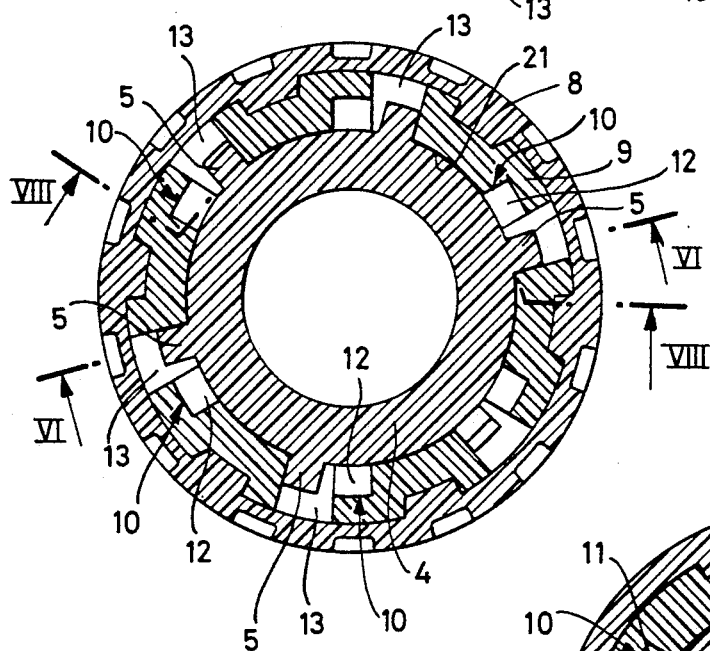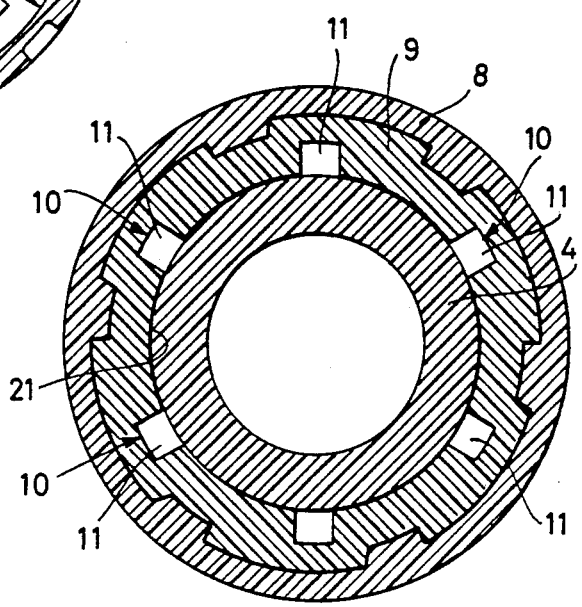

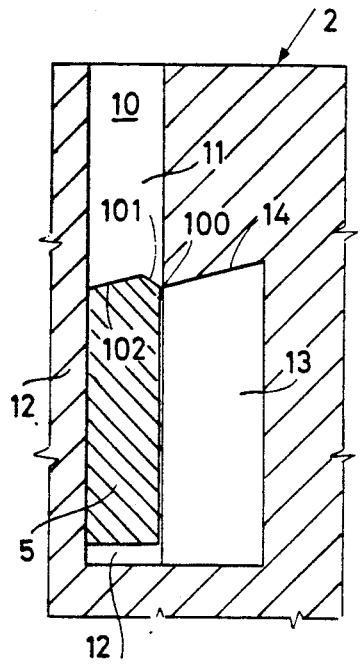
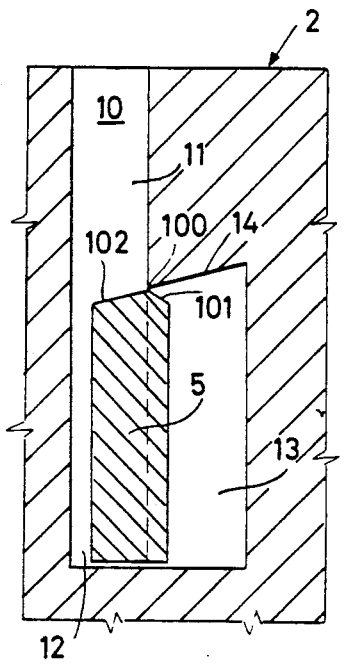
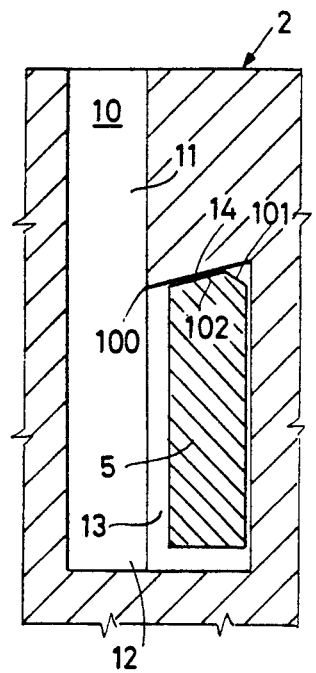
Fig. 7  Fig. 8  Fig. 9
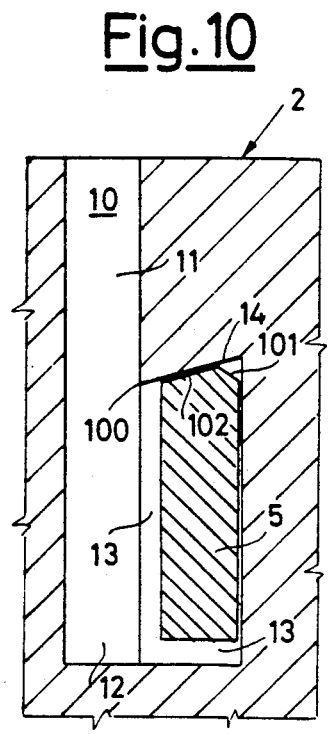
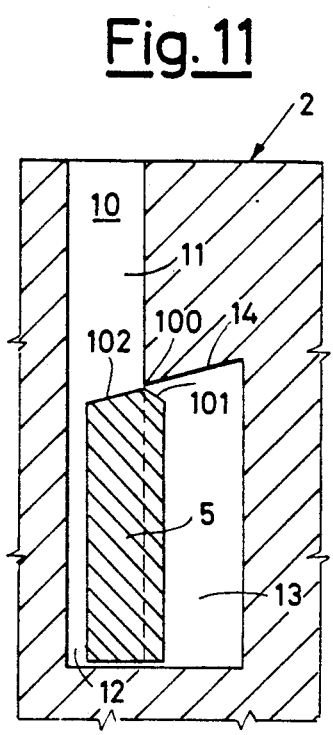
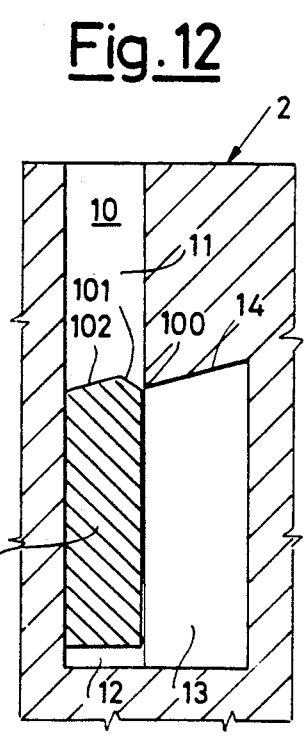
Fig. 10  Fig. 11  Fig. 12

MALE-FEMALE FITTING ELEMENT, IN PARTICULAR FOR HOSES HAVING A LARGE DIAMETER

FIELD OF THE INVENTION

The present invention relates to a male-female fitting element, suitable in particular for hoses having a large diameter.

BACKGROUND OF THE INVENTION

There are known and are commonly used for small flexible hoses male-female fittings wherein the male element is held by small radial pawls urged by elastic means interposed between an internal cylindrical part of the female and a sleeve which is axially slideable on said internal part.

For hoses having a large diameter (typically one inch), fittings having the same structural and operational characteristics of the fittings used for smaller diameter hoses (say, half an inch) there are several problems.

The first problem is the size of such fittings, which may make their use not all that easy.

There are also problems connected with the plastic material of which said fittings are made; if the thickness of the plastic is large it is necessary to use special dies and the cost of the material increases. If the thickness of the plastic remains small significant deformations may occur due to the lower resistance of the plastic; there are also dangers of breakage or of undesired clearances.

In addition the typical coupling of small-diameter hose fittings, with two or three small pawls, is not that safe for fittings having a larger diameter.

Another drawback is due to the fact that in large hoses there is a low pressure and a high delivery, so that constricting the cross-section is particularly undesirable; with the usual fittings for small hoses, transformed into large fittings, there would be a constriction at the point where the hose is connected, and another constriction at the entrance of the male element.

Lastly, there exists a considerable disproportion between the external dimensions of the fitting and the actual internal cross-section available for the passage of the fluid, which would be substantially reduced.

SUMMARY OF THE INVENTION

The object of the present invention is to obtain a fitting with a reduced external size, which is simple to use, which has the highest degree of coupling safety, which is easy to manufacture and which avoids fluid pressure losses.

According to the invention such object is attained with a male-female fitting element, characterized in that it is constituted by a male element, comprising a hollow cylindrical tang having in the axial direction a plurality of radially protruding ribs, and by a female element, essentially constituted by a hollow cylindrical casing with an internal wall provided with a corresponding plurality of axial grooves for the sliding reception of said ribs of the male element, each of said grooves being flanked by a lateral seat suitable for receiving one of said, respective ribs by rotation of said male element at the end of the sliding of said ribs in said grooves, so that said ribs are held in the respective seats by the abutment of an extremity of the rib against a shoulder of said lateral seat.

There is thus accomplished a fitting element which is easy to manufacture and a limited size, is simple for the operator to use and has a considerable coupling safety.

Preferably in the female element there is introduced a Belleville washer, which at rotation counters the entry of the ribs into the seat, and after rotation contributes in holding said ribs in their seat; the shoulder of the lateral seats is, in addition, preferably shaped according to an inclined plane which contributes in coupling the ribs in their seat, which have a corresponding extremity shaped according to two inclined planes.

To provide for a safer coupling of the two male and female elements even under high releasing forces due to the pressure of the water or to any twisting actions exerted manually on the hose attached to the female element of the fitting, it can also be arranged that the female element be provided with a locking device, which thanks to a small pawl suitably urged from the outside goes to co-operate with a rib of the male element to prevent its rotation and the latter's consequent possible release.

BRIEF DESCRIPTION OF THE DRAWINGS

The characteristics of the present invention shall be made clearer by the following detailed descriptiom of two of its practical embodiments, illustrated as a non-limiting example in the enclosed drawings, wherein:

FIG. 3 shows a transversal cross-section of the fitting taken along the line III—III of FIG. 2;

FIG. 4 shows a transversal cross-section of the fitting taken along the line IV—IV of FIG. 2;

FIG. 5 shows a transversal cross-section of the fitting as in FIG. 3 when the male element is rotated in the locked position;

FIGS. 7, 8 and 9 show the sequence of actions which lead to the rotated position of the fitting;

FIGS. 10, 11 and 12 show the sequence of the actions which allow the release of the fitting;

DETAILED DESCRIPTION OF THE PREFERRED EMBODIMENTS

Figure 1:
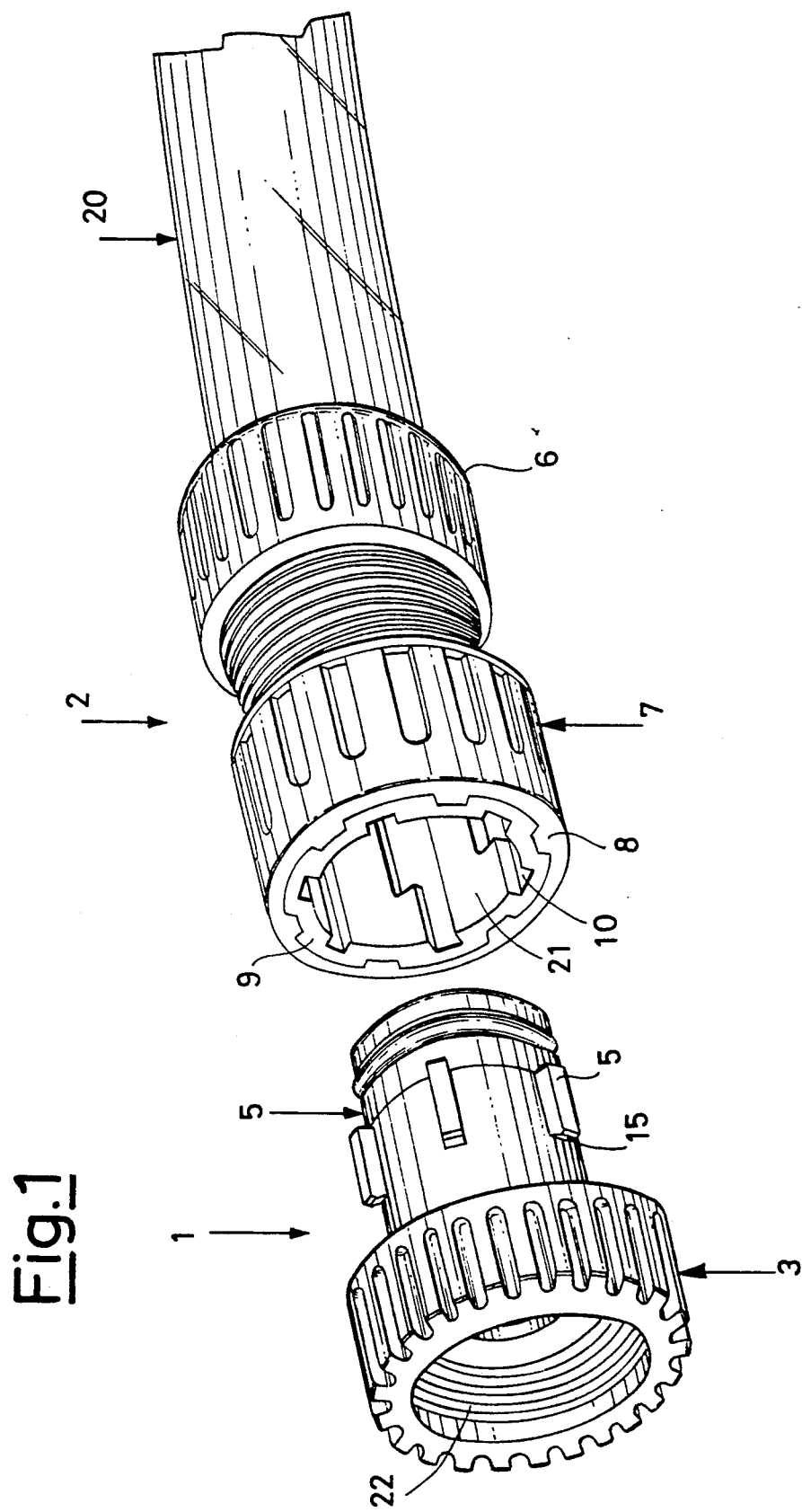
FIG. 1 shows a perspective view of a fitting element according to the invention, with the male element separated from the female element.
Figure 2:
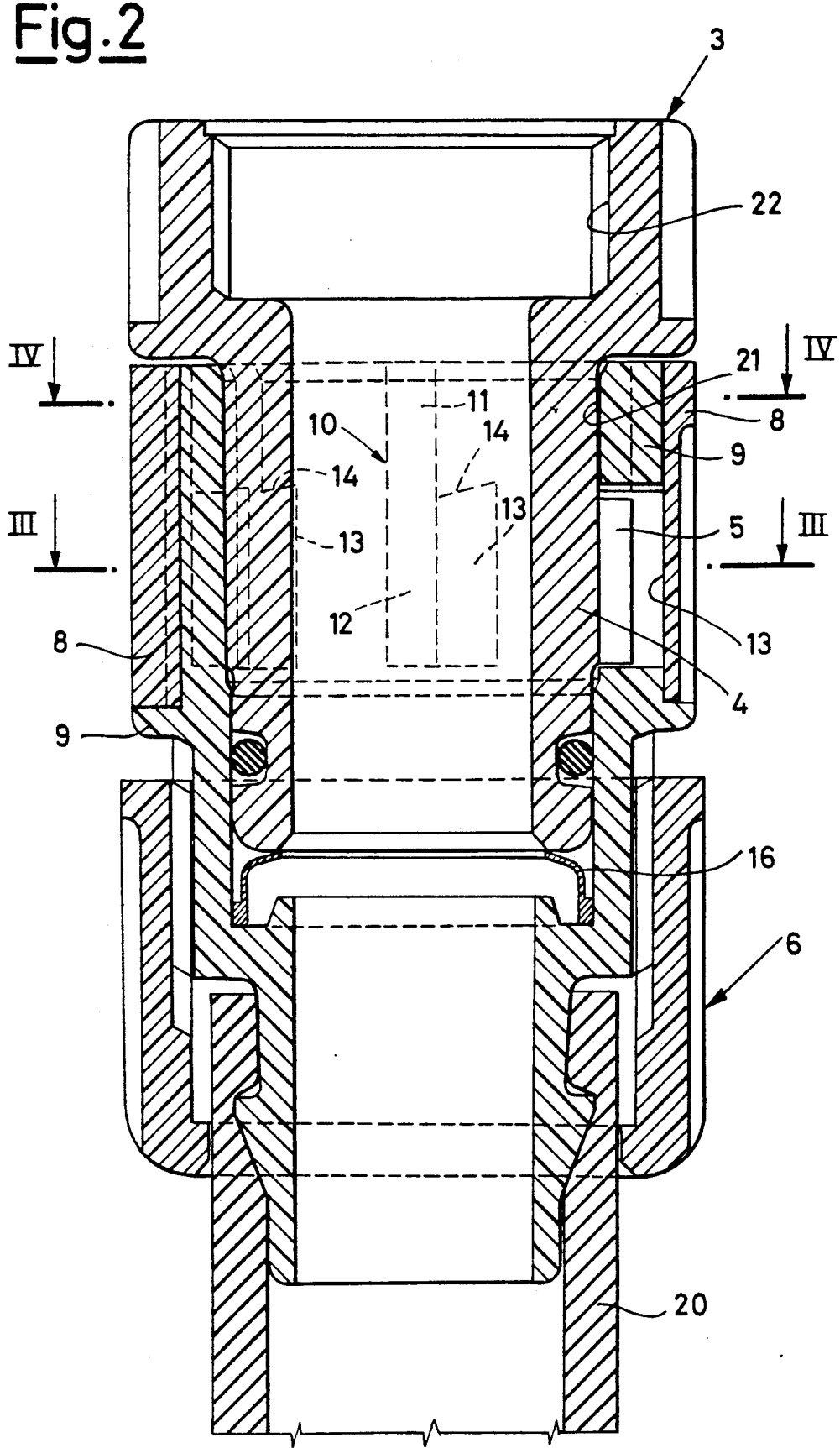
FIG. 2 shows a cross-section of the fitting element taken along the line II—II of FIG. 3, when the male element is inserted into the female element in a non-rotated position.
Figure 6:
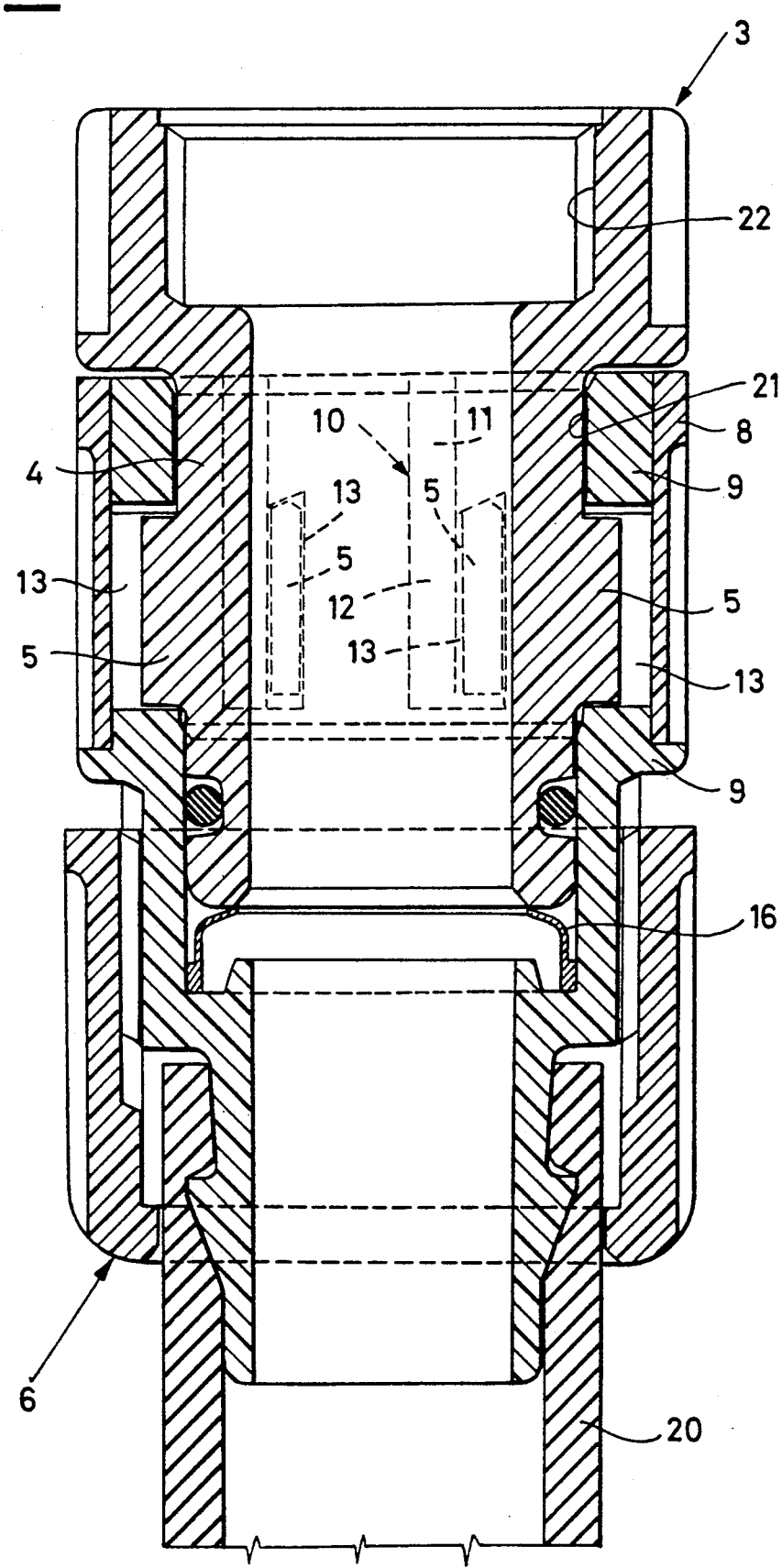
FIG. 6 shows an axial cross-section of the fitting taken along the line VI—VI of FIG. 5.
Figure 13:
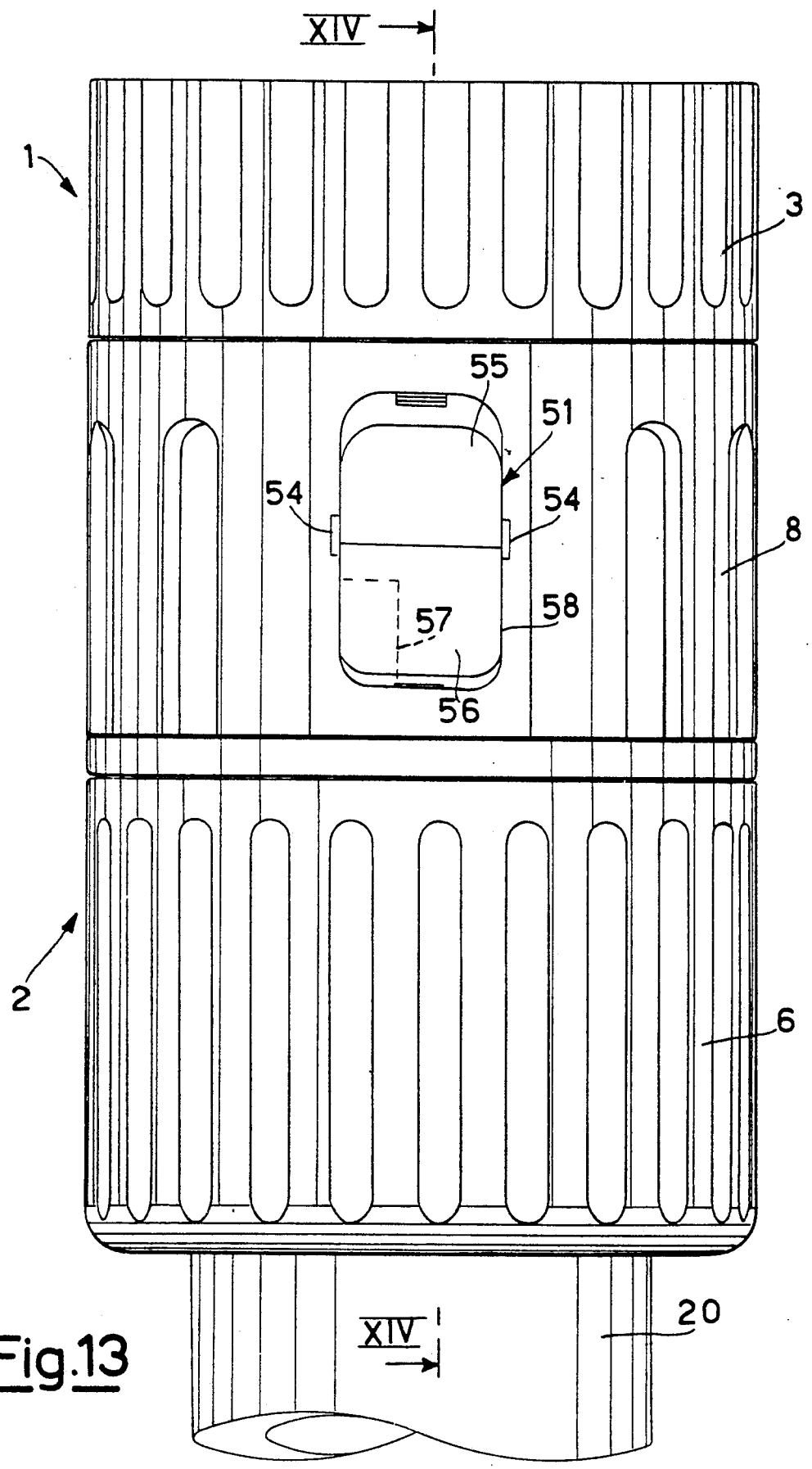
FIG. 13 shows the external lateral view of a variant of the fitting of FIGS. 1 to 12, which provides for the addition of a device for locking the reciprocal rotation of the male element and of the female element of the fitting.

With reference to the drawings, the fitting of FIGS. 1 to 12 comprises a male element 1 and a female element 2 which can be coupled together.

Said male element 1 is, as an example, constituted by a base 3 provided an internal thread 22, suitable for fastening it to a wate hydrant, and by a hollow cylindrical tang 4, on which there is a plurality of ribs 5, arranged in an axial direction and protruding radially; each of said ribs 5 has an extremity 15 shaped according to two inclined planes, forming a first enclined part 101, and a second inclined part 102.

The female element 2 has an extremity 6, of known shape, for coupling it to a flexible hose 20, and an extremity 7, constituted by a first external sleeve 8 and a second internal sleeve 9. On the internal wall 21 of said internal sleeve 9 of the female element 2 there is a plurality of ribs 10, having a length which is greater than that of said ribs 5, constituted by a first part 11, nearer the entry extremity of male element 1, and by a second part 12; this second part 12 of each of said grooves 10 is flanked by a lateral seat 13, having a shoulder 14 shaped according to an inclined plane.

The female element 2 is provided with a Belleville washer 16, located at the extremity opposite the extremity used for the entry of the male element 1.

When the fitting is to be coupled the tang 4 of the male element 1 is introduced into the female element 2, by axially sliding each of the ribs 5 in a corresponding groove 10. When each of said ribs 5 meets part 12 of the corresponding groove 10, the male element 1 is made to rotate so that the ribs 5 are moved to seats 13. The sequence of the entry stages of the ribs 5 into the lateral seats 13 is illustrated in FIGS, 7, 8 and 9; at the beginning of rotation (FIG. 7) of the first inclined part 101 of extremity 15, countering the action of the Belleville washer 16, it goes past an edge 100 of groove 10; after the inclined part 101 has penetrated completely into the lateral seat 13 following the partial rotation of the male element 1 (FIG. 8), the combined action of the Belleville washer 16 and of the second inclined part 102 of extremity 15 causes the complete entry of said rib into its seat; subsequently the elastic action of the Belleville washer 16 contributes in maintaining said ribs 5 in the corresponding seats 13.

FIGS. 10, 11 and 12 illustrate the sequence of the exit stages of each rib 5 from the lateral seats 13; in the initial stage of rotation it is necessary to apply a certain force to overcome the action of the Belleville washer 16; when the rib 5 is in the position shown in FIG. 11, the combined action of the washer 16 and of the inclined part 101 make release easier.

The release of the fitting element is thus possible only with a direct action on the part of the operator, who must rotate the male element 1 in a counter direction, countering the action of the Belleville washer 16 and the resistance opposed by shoulders 14 and extremities 15 of ribs 5, due to their particular shape according to inclined planes.

The fitting of FIGS. 13 to 22 is substantially similar to that of FIGS. 1 to 12, whose same reference numbers are used for corresponding parts and whose detailed description will not be repeated here.

Figure 16:
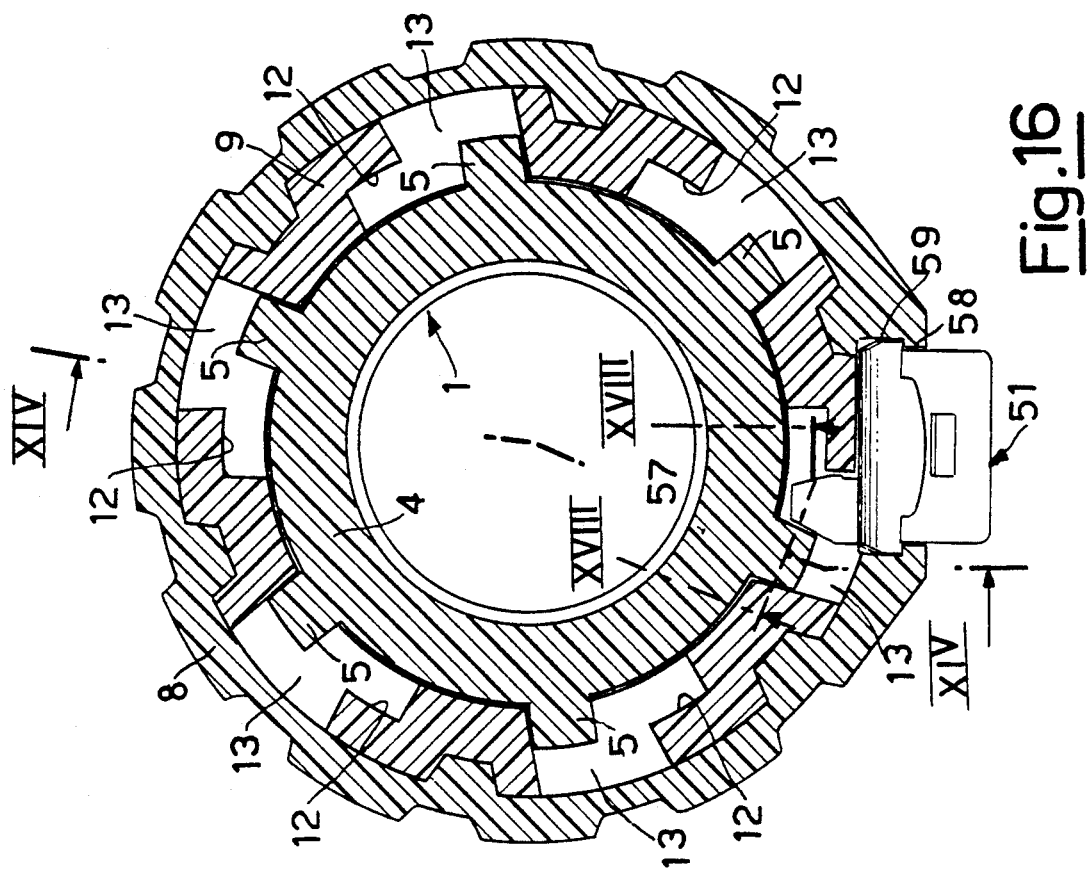
FIG. 16 shows said fitting in a transversal cross-section taken along the line XVI—XVI of FIG. 14.

As the sole but important variant, it includes a locking device 51 which, when in the active position, prevents the reciprocal rotation of the male element 1 and of the female element 2 from the coupling position of FIG. 16 under conditions of force in this direction due to any twisting actions exerted either manually or by the pressure of the water on the flexible hose attached to the female element of the fitting.

The locking device 51 shown in detail in FIGS. 19 to 22 and comprises a lever-type casing 52 having an essentially rectangular shape with a central pivot 53 protruding laterally from the casing itself to define fulcrum extremities 54. The lever-type casing 52 has an external operating face devided into two sectors 55 and 56 at different angles of inclination, which are used for the operation of the device, while from the inside, at one of its angles, the locking pawl 57 is extended.

As illustrated in FIGS. 13 to 17, the lever-type casing 52 of the locking device 51 is housed in a rectangular seat 58 of external sleeve 8 of the female element 2 and pivoted at this point by the insertion of extremities 54 of the pivot 53 into corresponding notches 59 of the seay 58. In this condition the locking pawl 57 extends to a greater or lesser extent inside one of the lateral seats 13 for reciving ribs 5 of the male element 1 according to the angular position of the lever-type casing 52.

Figure 15:
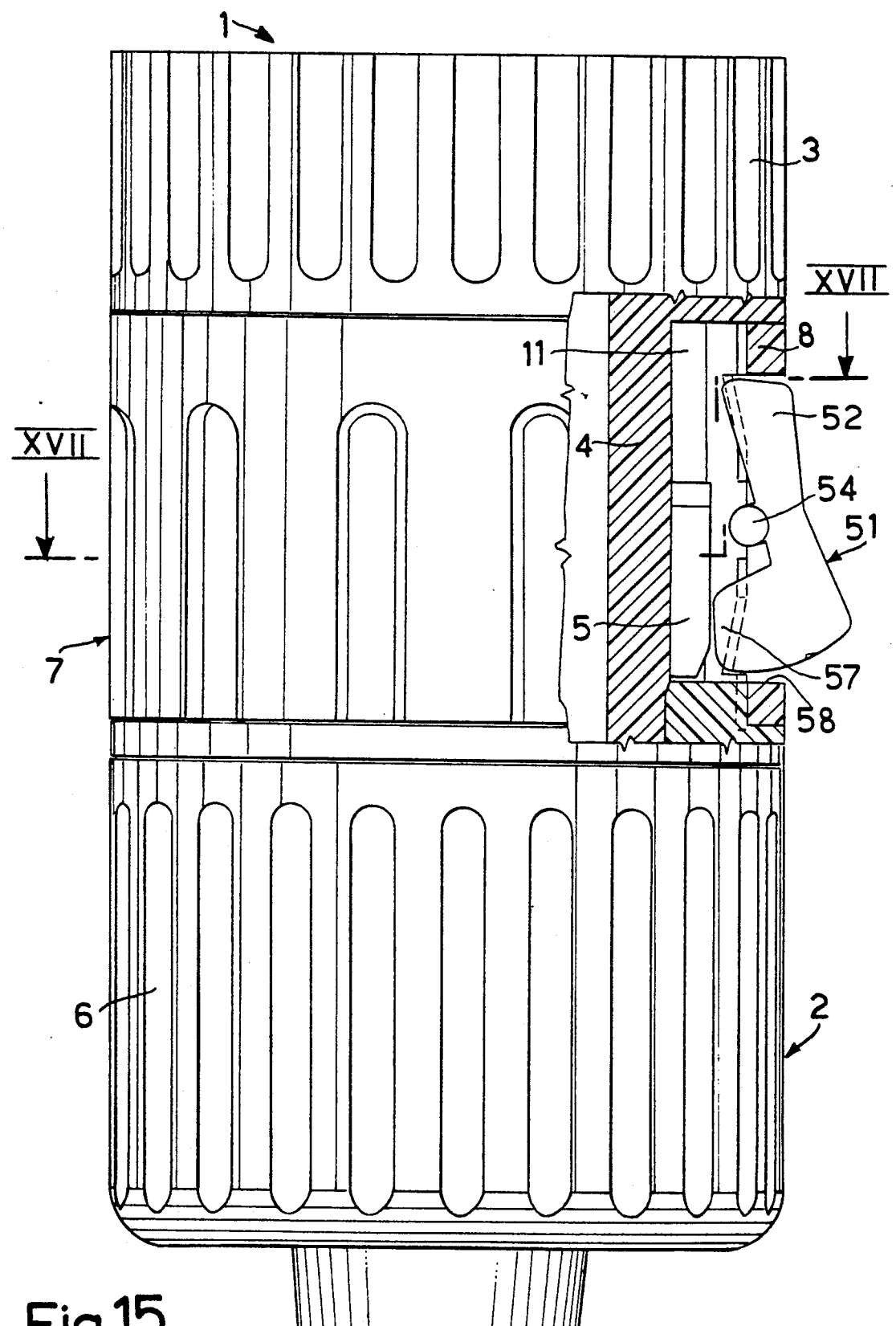
FIG. 15 shows the same fitting in an axial cross-section as in FIG. 14 but with the locking device in the inactive position, and the male element of the fitting rotated in the position suitable for releasing the female element.
Figure 17:
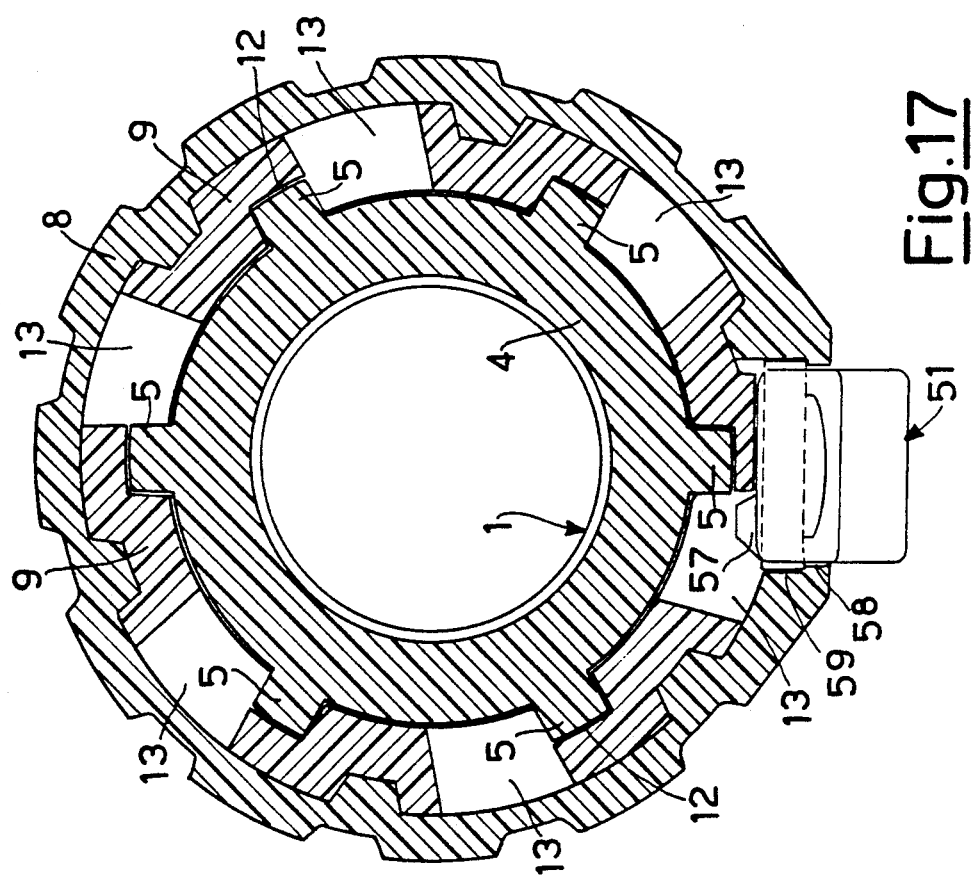
FIG. 17 shows said fitting in a transversal cross-section taken along the line XVII—XVII of FIG. 15.
Figure 18:
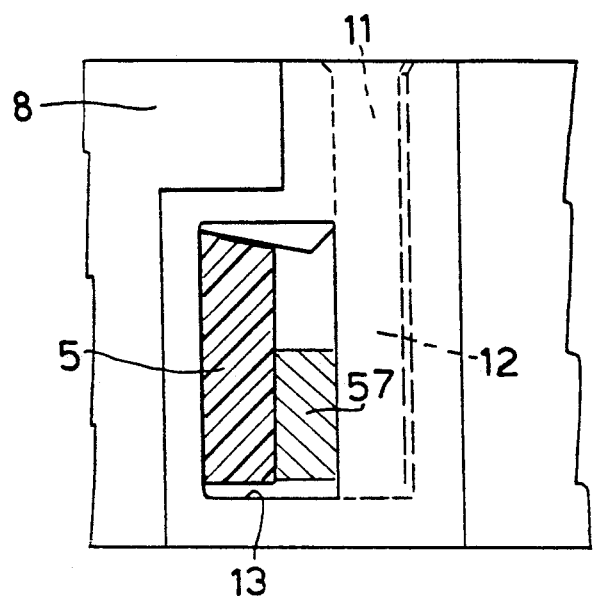
FIG. 18 shows the enlarged detail, in a cross-section taken along the line XVIII—XVIII of FIG.16, of the locking engagement attained by the locking device when in the active position.
Figure 20:
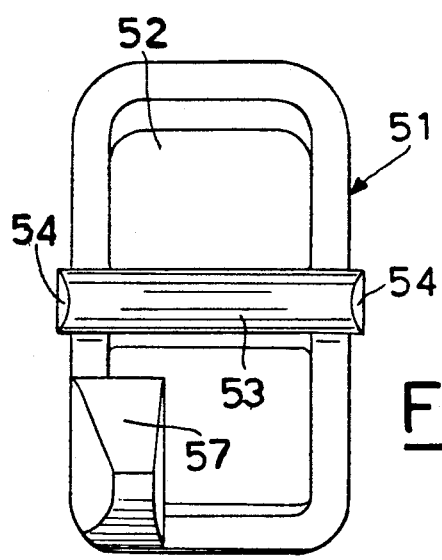
FIGS. 19 to 22 show the locking device from the outside, from the inside, from the side and from the front of the fitting, respectively.
Figure 19:
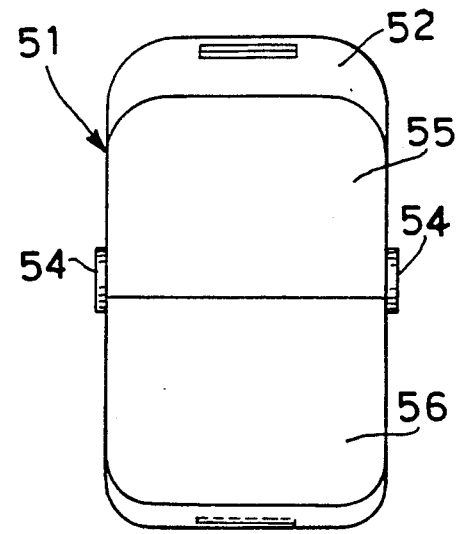
Figure 21:
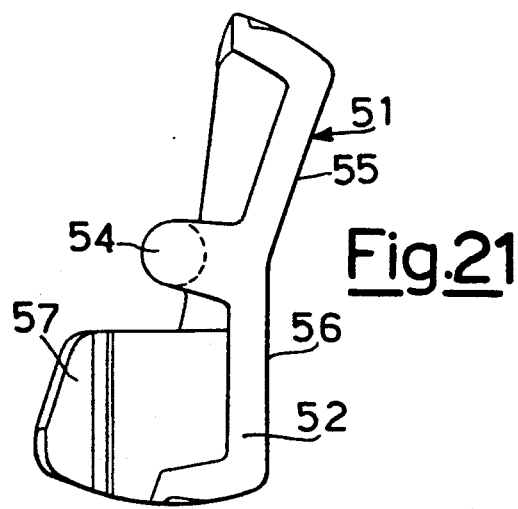
Figure 22:
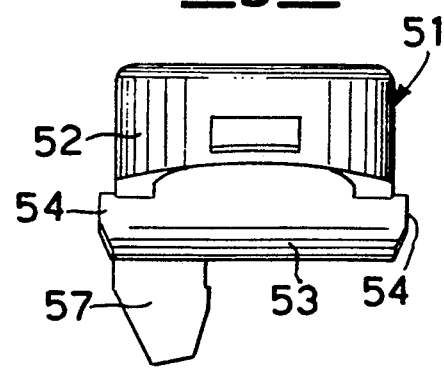

If the lever-type casing 52 is in the angular position of FIGS. 15 and 17, rhe pawl 57 extends to a limited degree inside seat 13 and is not in a position to interfere with the rotation movement of ribs 5 of the male element 1, either in the coupling stage or in the release stage of the two male and female elements of the fitting. The locking device 51 is then said to be in the inactive position.

Figure 14:
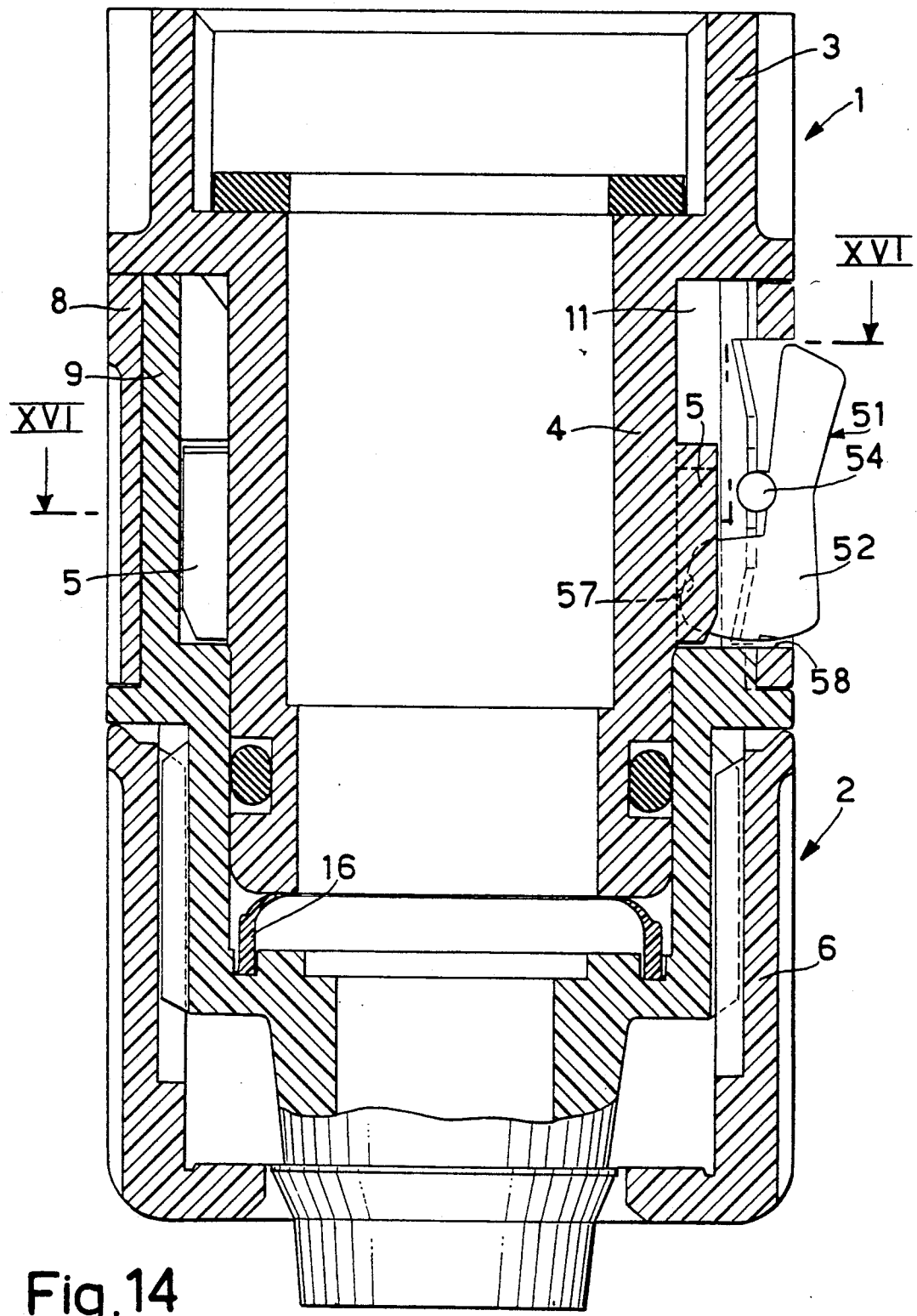
FIG. 14 shows the fitting of FIG. 13 in an axial cross-section taken along the line XIV—XIV of FIGS. 13 and 16 with the locking device in the active position.

If, on the other hand, the lever-type casing 52 is in the angular position of FIGS. 14 and 16, the pawl 57 extends to a greater degree inside the seat 13 and does interfere with the rotation movement of ribs 5, already inserted inside their respective seats 13, so that as to prevent its displacement from the coupling position of FIG. 16 to that of a possible release of FIG. 17. This situation, also illustrated in FIG. 18, ensures that the fitting is not subject to undesired releases following any twisting actions, however produced.

I claim:
1. A male-female fitting element, comprising:
    a male element having a hollow cylindrical tang, said tang providing a plurality of radially protruding ribs oriented in an axially direction; and
    a female element including a hollow cylindrical casing having an internal wall provided with a plurality of axial grooves for sliding reception of said ribs, each of said grooves being flanked by a lateral seat suitable for receiving each of said ribs by rotation of said male element after said ribs are slid to ends of said grooves, said lateral seats providing shoulders for abutting extremities of said ribs,
    wherein said female element further includes a Belleville washer located at an extremity of said female element opposite to an entry extremity for said male element, said Belleville washer urging said male element ribs engagement with said lateral seat shoulders for preventing removal of said male element from said female element when said ribs are disposed in said lateral seats,
    wherein said annular rib extremities and said lateral seat shoulders are each formed by two inclined planes relative to a circumference of said female element for retarding rotational removal of said ribs from said lateral seats.

2. A male-female fitting element, comprising:

a male element having a hollow cylindrical tang, said tang providing a plurality of radially protruding ribs oriented in an axially direction;

a female element including a hollow cylindrical casing having an internal wall provided with a plurality of axial grooves for sliding reception of said ribs, each of said grooves being flanked by a lateral seat suitable for receiving each of said ribs by rotation of said male element after said ribs are slid to ends of said grooves, said lateral seats providing shoulders for abutting extremities of said ribs, wherein said female element further includes a Belleville washer located at an extremity of said female element opposite to an entry extremity for said male element, said Belleville washer urging said male element ribs into engagement with said lateral seat shoulders for preventing removal of said male element from said female element when said ribs are disposed in said lateral seats; and a locking device having a lever-type casing rotatable housed in a seat of said female element for movement between an inactive position and an active position wherein a protruding pawl of said locking device is inserted into one of said lateral seats so as to lock a corresponding rib of said male element in said seat and prevent releasing rotation of said male element when said locking device is in said active position.

* * * * *

UNITED STATES PATENT AND TRADEMARK OFFICE
CERTIFICATE OF CORRECTION

PATENT NO.   : 5,072,971
DATED        : December 17, 1991
INVENTOR(S)  : Gianfranco Roman It is certified that error appears in the above-identified patent and that said Letters Patent is hereby corrected as shown below:

```
Column 1, line 17, after "female" insert --element--.
Column 2, line 2, after "and" insert --has--.
          line 13, after "due" insert --either--.
          line 20, after "its" insert --contrary--.
Column 3, line 11, after "provided" insert --with--.
          line 47, replace "rib" with --rib 5--.
Column 4, line 9, after "51" insert --is--.
          line 14, replace "devided" with --divided--.
          line 28, replace "rhe" with --the--.
          line 62, after "ribs" insert --into--.
```

Signed and Sealed this

Thirtieth Day of March, 1993

Attest:

STEPHEN G. KUNIN

Attesting Officer    Acting Commissioner of Patents and Trademarks